(12) United States Patent
Hidaka et al.

(10) Patent No.: US 12,318,990 B2
(45) Date of Patent: Jun. 3, 2025

(54) RESIN CONTAINER MANUFACTURING DEVICE AND MANUFACTURING METHOD

(71) Applicant: NISSEI ASB MACHINE CO., LTD., Nagano (JP)

(72) Inventors: Yasuhiro Hidaka, Nagano (JP); Tomoaki Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 18/590,089

(22) Filed: Feb. 28, 2024

(65) Prior Publication Data

US 2024/0278478 A1    Aug. 22, 2024

Related U.S. Application Data

(63) Continuation of application No. 17/600,790, filed as application No. PCT/JP2020/015382 on Apr. 3, 2020, now Pat. No. 11,958,231.

(30) Foreign Application Priority Data

Apr. 3, 2019    (JP) .................................. 2019-071569

(51) Int. Cl.
*B29C 49/12*    (2006.01)
*B29C 49/10*    (2006.01)
(Continued)

(52) U.S. Cl.
CPC ............ *B29C 49/12* (2013.01); *B29C 49/123* (2022.05); *B29C 49/28* (2013.01); *B29C 49/78* (2013.01);
(Continued)

(58) Field of Classification Search
CPC ....... B29C 49/12; B29C 49/123; B29C 49/78; B29C 49/783; B29C 2049/7832; B29C 2049/7882
See application file for complete search history.

(56) References Cited

U.S. PATENT DOCUMENTS 5,169,705 A    12/1992    Coxhead et al.
5,470,218 A *  11/1995    Hillman ................. B29C 49/78
                                                           425/149
(Continued)

FOREIGN PATENT DOCUMENTS

CN    104411475    3/2015
JP    6-99479      4/1994
(Continued)

OTHER PUBLICATIONS

International Search Report issued in International Patent Application No. PCT/JP2020/015382, dated Jul. 7, 2020, along with an English translation thereof.
(Continued)

*Primary Examiner* — Robert B Davis
(74) *Attorney, Agent, or Firm* — Greenblum & Bernstein, P.L.C.

(57) ABSTRACT

There is provided a resin container manufacturing apparatus configured to stretch a preform disposed in a stretch blow molding mold by a stretching rod and stretch the preform by introducing blow air into the preform so as to form a resin container. The resin container manufacturing apparatus includes detection means for detecting an actual position of the stretching rod inserted into the preform, and supply control means for controlling a supply state of the blow air based on a detection result of the detection means.

10 Claims, 8 Drawing Sheets

(51) Int. Cl.
    *B29C 49/28*    (2006.01)
    *B29C 49/78*    (2006.01)
    *B29C 49/48*    (2006.01)

(52) U.S. Cl.
    CPC .... *B29C 49/783* (2013.01); *B29C 2049/4887* (2013.01); *B29C 2049/4892* (2013.01)

(56) References Cited

U.S. PATENT DOCUMENTS

| | | |
|---|---|---|
| 10,751,927 B2 | 8/2020 | Derrien |
| 2015/0042021 A1 | 2/2015 | Schmid |
| 2015/0298386 A1 | 10/2015 | Letestu et al. |
| 2017/0203495 A1 | 7/2017 | Derrien |

FOREIGN PATENT DOCUMENTS

| | | |
|---|---|---|
| JP | 6-254955 | 9/1994 |
| JP | 9-272147 | 10/1997 |
| JP | 10-76568 | 3/1998 |
| JP | 2003-231170 | 8/2003 |
| KR | 20130108920 | 10/2013 |
| WO | 2010083810 | 7/2010 |
| WO | 2014/068080 | 5/2014 |

OTHER PUBLICATIONS

Written Opinion of the International Searching Authority issued in International Application No. PCT/JP2020/015382, dated Jul. 7, 2020.

Office Action issued in corresponding Indian Patent Application No. 202127044617 dated Mar. 10, 2022.

Extended European Search Report Issued in Corresponding EP Patent Application No. 20783063.9, dated Dec. 2, 2022.

Office Action Issued in Corresponding CN Patent Application No. 202080033679.8, dated Feb. 6, 2023, along with an English translation thereof.

* cited by examiner

RESIN CONTAINER MANUFACTURING DEVICE AND MANUFACTURING METHOD

CROSS-REFERENCE TO RELATED APPLICATIONS

This is a continuation of U.S. patent application Ser. No. 17/600,790, filed Oct. 1, 2021, which is a National Phase application of International Application No. PCT/JP2020/015382, filed Apr. 3, 2020, which claims the benefit of priority to Japanese Application No. 2019-071569 filed Apr. 3, 2019. The disclosure of each of the above-mentioned documents, including the specification, drawings, and claims, is incorporated herein by reference in its entirety.

TECHNICAL FIELD

The present disclosure relates to a manufacturing apparatus and a manufacturing method for manufacturing a resin container (hollow container) filled with a beverage or the like. More specifically, the present invention relates to a resin container manufacturing apparatus and resin container manufacturing method in which an injection-molded preform is formed into a resin container by stretch blow molding.

BACKGROUND ART

For example, there is known a two-axis stretch blow molding apparatus in related art in which a preform is stretch blow molded to form a resin container, as an apparatus for manufacturing a resin container (hollow container) made of a resin material such as polyethylene terephthalate (PET).

Generally, it is known that the two-axis stretch blow molding apparatus stretches a preform by a stretching rod and stretches the preform by high-pressure blow air in a state in which the preform formed by injection molding is disposed in a blow molding mold, so as to form a resin container (for example, see Patent Literature 1).

When the preform is stretched by the stretching rod and the blow air in such a manner, the operation of the stretching rod and the supply of the blow air are generally controlled independently. For example, the start of the supply of the blow air is controlled based on a waiting time starting from a blow start time, and is controlled independently of the operation of the stretching rod.

CITATION LIST

Patent Literature

Patent Literature 1: JP-A-2003-231170

SUMMARY OF INVENTION

Technical Problem

Here, there is a resin container manufacturing apparatus including an injection molding part that injection molds a preform and a stretch blow molding part that stretch blow molds the preform. The preform conveyed from the injection molding part is formed into a resin container (hollow container) by the stretch blow molding part.

In such a resin container manufacturing apparatus, the resin container is formed by stretch blow molding the preform in the stretch blow molding part while the preform is injection-molded in the injection molding part. Therefore, it is necessary to set a stretch blow molding time in accordance with an injection molding time of the preform.

In recent years, the injection molding time (including a cooling time) of the preform is significantly shortened, and accordingly, it is desired to shorten a molding cycle time (to achieve a high cycle). In order to shorten the molding cycle time, it is necessary to shorten the stretch blow molding time in accordance with the shortening of the injection molding time.

However, when the stretching rod and the supply of the blow air are independently controlled, it is difficult to deal with the shortening of the molding cycle time. That is, in a control based on the waiting time starting from the blow start time as described above (in a timer control type), it is difficult to deal with blow molding with a shortened molding cycle time.

In the timer control type, a lowering start time of the stretching rod and an introduction start time of the blow air are set, for example, in units of 10 milliseconds with the blow start time as a starting point. In the timer control type, there is a small error between a set start time and an actual start time related to the lowering of the stretching rod or the introduction of the blow air due to a mechanical configuration. This error affects blow molding. For example, quality (physical properties, appearance, and the like) of a container may be lowered, molding defects such as rupture may frequently occur, and moldability and productivity of the container in the blow molding may be unstable. The influence of the error on the blow molding may be large when the blow molding time is short.

Further, when the blow molding time is shortened, it is very difficult to appropriately balance the lowering start time of the stretching rod and the introduction start time of the blow air that are independent parameters.

When the molding cycle time (stretch blow molding time) is shortened, quality of the resin container may deteriorate. In addition, molding defects such as rupture may frequently occur at the time of blow molding, and molding stability may deteriorate.

The present disclosure has been made in view of such circumstances, and an object of the present disclosure is to provide a resin container manufacturing apparatus and a resin container manufacturing method that can appropriately stretch blow mold a preform in a relatively short time and can stably manufacture a resin container having good quality.

Solution to Problem

According to an aspect for achieving the above object, there is provided a resin container manufacturing apparatus configured to stretch a preform disposed in a stretch blow molding mold by a stretching rod and stretch the preform by introducing blow air into the preform so as to form a resin container, the resin container manufacturing apparatus including:
  detection means for detecting an actual position of the stretching rod inserted into the preform; and
  supply control means for controlling a supply state of the blow air based on a detection result of the detection means.

Here, it is preferable that a drive source of the stretching rod is a servo motor, and the detection means detects the actual position of the stretching rod based on a rotational position of the servo motor.

According to another aspect for achieving the above object, there is provided a resin container manufacturing method in which a preform disposed in a stretch blow molding mold is stretched by a stretching rod and the preform is stretched by introducing blow air into the preform so as to form a resin container, the resin container manufacturing method including: detecting an actual position of the stretching rod inserted into the preform; and controlling a supply state of the blow air based on the actual position of the stretching rod.

Advantageous Effects of Invention

According to the present disclosure, it is possible to stably manufacture a resin container (hollow container) having good quality by appropriately stretching the preform even under a condition (high cycle condition) in which a stretch blow molding time is very short.

DESCRIPTION OF EMBODIMENTS

First Embodiment

Hereinafter, a first embodiment of the present disclosure will be described in detail with reference to FIGS. 1 to 5.

Figure 1:
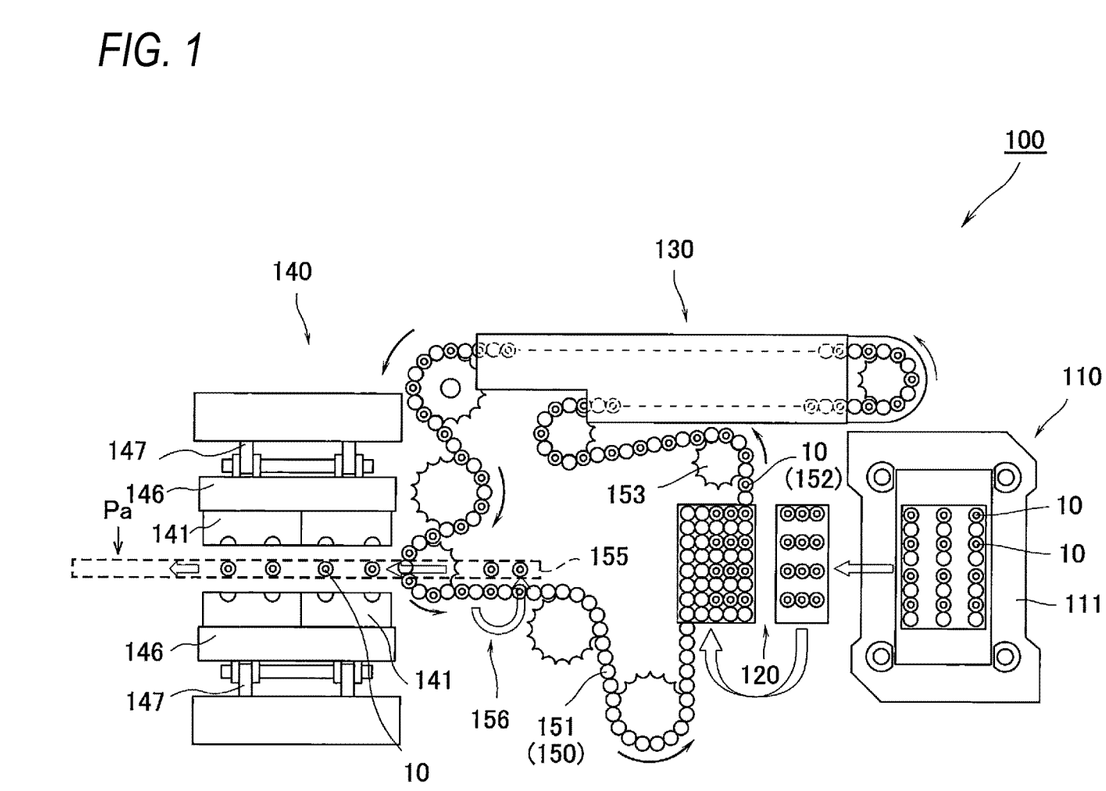
FIG. 1 is a plan view showing an overall configuration of a stretch blow molding apparatus according to an embodiment of the present disclosure.
Figures 3A, 3C:
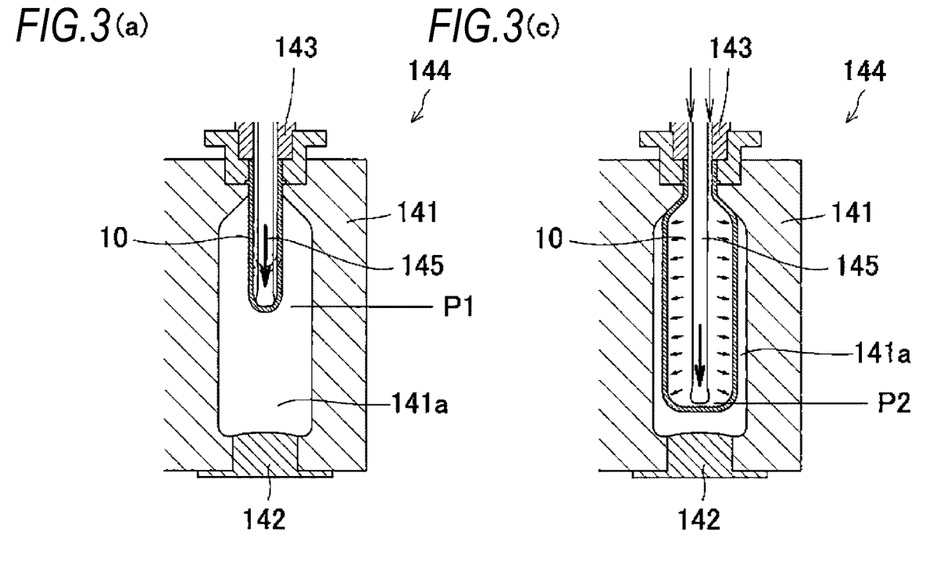
FIG. 3(a), FIG. 3(b), FIG. 3(c), and FIG. 3(d) show a procedure for molding a hollow container by a stretch blow molding part according to an embodiment of the present disclosure.
Figure 3B:
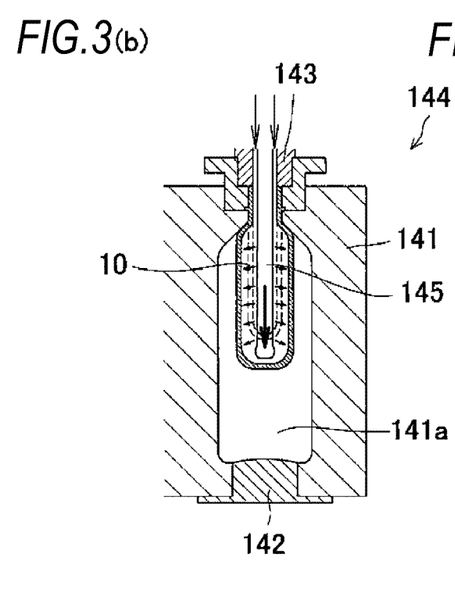
Figure 3D:
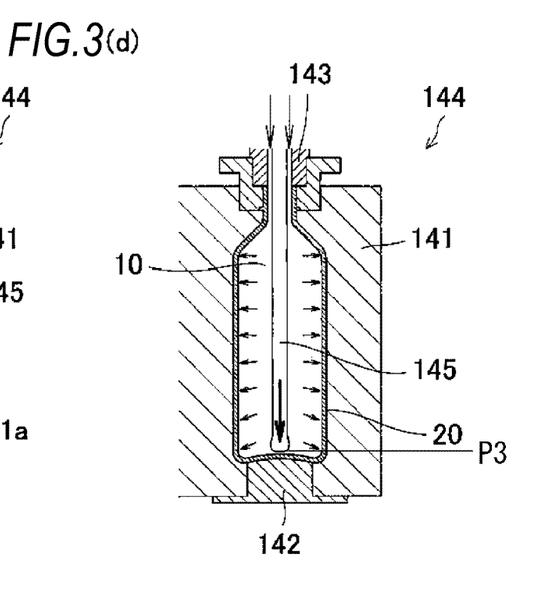

As shown in FIG. 1, an injection stretch blow molding apparatus 100 that is a resin container manufacturing apparatus according to the present embodiment includes an injection molding part 110 that injection mold a bottomed cylindrical preform 10, a cooling part 120 that cools the preform 10 molded by the injection molding part 110, a heating part (heating device) 130 that heats the preform 10, and a stretch blow molding part 140 that stretch blow molds the preform 10 heated by the heating part 130 to mold a hollow container 20 (see FIG. 3).

The injection molding part 110 and the stretch blow molding part 140 are connected in an in-line manner, and the injection stretch blow molding apparatus 100 is an apparatus of a so-called 1.5-stage system in which the number of simultaneous injection molding and the number of simultaneous blow molding are not the same.

The injection stretch blow molding apparatus 100 includes a conveyance part 150 including a loop-shaped conveyance line (conveyance path) 151 that circulates from the cooling part 120 to the heating part 130 and the stretch blow molding part 140. The conveyance part 150 conveys the preform 10 from the cooling part 120 to the heating part 130 on the conveyance line 151, and conveys the preform 10 heated by the heating part 130 toward the stretch blow molding part 140. Further, the conveyance part 150 includes a gripping mechanism conveyance part 155 that grips the preform 10 conveyed along the conveyance line 151 and conveys the preform 10 into the stretch blow molding part 140.

The gripping mechanism conveyance part 155 conveys the preform 10 into the stretch blow molding part 140, grips and conveys an intermediate molded product in the stretch blow molding part 140, which will be described later, grips the hollow container 20 that is a final molded product, and conveys the hollow container 20 out from the stretch blow molding part 140 to a take-out position.

The injection stretch blow molding apparatus 100 according to the present disclosure is characterized in the configuration of the stretch blow molding part (stretch blow molding apparatus) 140. Other configurations such as the injection molding part 110, the cooling part 120, and the heating part 130 are known, and these parts will be briefly described here.

The injection molding part 110 includes a mold clamping mechanism (mold clamping device) 111 which clamps a core mold (not shown) disposed at an upper side and a cavity mold (not shown) disposed at a lower side. In the injection molding part 110, a plurality of preforms 10 are injection-molded by filling an injection space defined by the core mold and the cavity mold with a resin material (raw material) using an injection device.

The injection molding part 110 can mold N (N is an integer of 2 or more) preforms 10 at a time. Specifically, the injection molding part 110 can simultaneously mold up to 24 (3 rows×8) preforms 10. In the present embodiment, the injection molding part 110 is set to mold 12 (3 rows×4) preforms 10 at a time.

The cooling part 120 forcibly cools the preforms 10. The preforms 10 injection-molded by the injection molding part 110 are conveyed from the injection molding part 110 to the cooling part 120 by a conveyance device (not shown), and are forcibly cooled by the cooling part 120. The preforms 10 cooled to a predetermined temperature by the cooling part 120 are sent out to the conveyance line 151 provided in the conveyance part 150, and are continuously conveyed along the conveyance line 151.

The preforms 10 are molded by the injection molding part 110 in an upright state with a neck portion facing upward, and are conveyed from the injection molding part 110 to the cooling part 120 in this state. The cooling part 120 includes a reversing mechanism (not shown) that reverses the preform 10 conveyed in the upright state to an inverted state with the neck portion facing downward. When the preforms 10 are cooled in the cooling part 120, the preforms 10 are reversed to the inverted state by the reversing mechanism, and are held in the inverted state on a conveyance jig 152.

As described above, since the injection molding part 110 forms 12 preforms 10 in the present embodiment, the conveying jigs 152 are continuously conveyed, and the preforms 10 are respectively held by every other conveyance jig 152.

The conveyance line 151 continuously and sequentially conveys a plurality of conveyance jigs 152 by a driving force of a sprocket 153 or the like. The conveyance jigs 152 are arranged in a plurality of rows below the cooling part 120, and the conveyance jigs 152 that hold the preforms 10 are sequentially conveyed out to the conveyance line 151. Thereafter, the preforms 10 held by the conveyance jigs 152 are conveyed along the conveyance line 151 and are conveyed into the heating part (heating device) 130.

In the heating part 130, the preforms 10 held by the conveyance jigs 152 are heated to an appropriate stretch temperature while being moved along the conveyance line 151. The conveyance part 150 is configured such that the conveyance jigs 152 move while rotating on the conveyance line 151. That is, the preforms 10 are heated while rotating in the heating part 130. As a result, the preforms 10 are each heated to a substantially uniform temperature over the entire circumference of the preforms 10 in the heating part 130.

After the preforms 10 are heated by the heating part 130, the preforms 10 are further conveyed along the conveyance line 151 and are conveyed into the stretch blow molding part 140. Specifically, the preforms 10 are conveyed along the conveyance line 151 to a reversing part 156 including the reversing mechanism (not shown). The preforms 10 continuously conveyed along the conveyance line 151 are reversed by a predetermined number and are brought into an upright state by the reversing part 156. Then, the preforms 10 in the upright state are gripped by the gripping mechanism conveyance part 155 and conveyed to the stretch blow molding part 140.

Then, the predetermined number of the preforms 10 gripped by the gripping mechanism conveyance part 155 in the reversing part 156 are conveyed into blow cavity molds 141. The gripping mechanism conveyance part 155 appropriately adjusts an interval between the preforms 10 while causing the preforms 10 to slide.

A configuration of the gripping mechanism conveyance part 155 is not particularly limited as long as the gripping mechanism conveyance part 155 can grip neck portions of the preforms 10 and move the preforms 10 to the stretch blow molding part 140 in such a gripped state.

Figure 2:
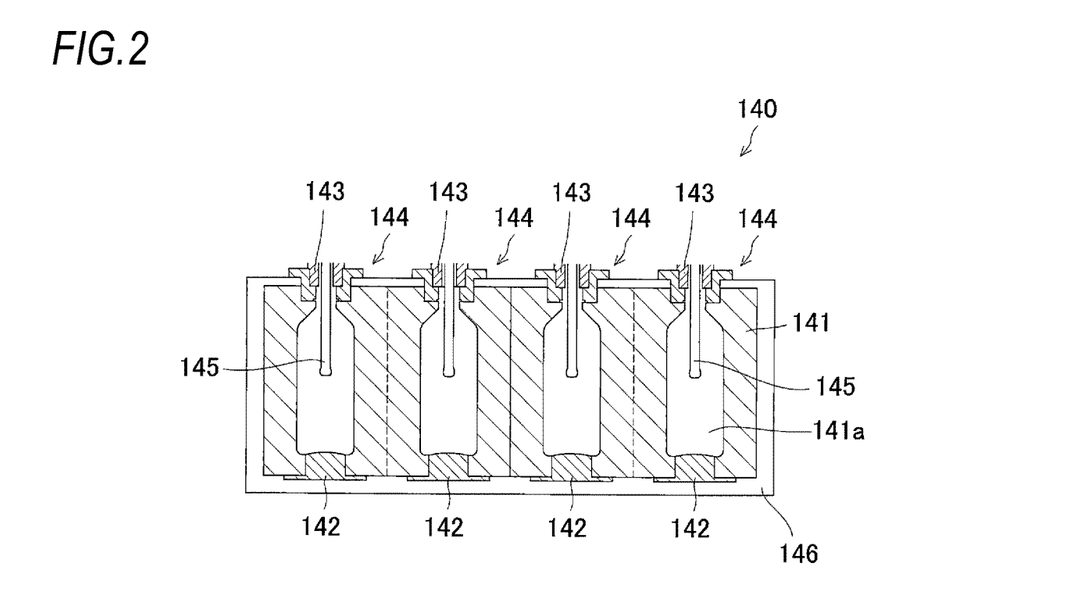
FIG. 2 is a diagram showing a configuration of a stretch blow molding part according to the present disclosure, and is a cross-sectional view showing a stretch blow molding mold.

As shown in FIG. 2, the stretch blow molding part 140 includes a plurality of stretch blow molding molds 144 each including the blow cavity mold 141 formed of a pair of split molds, a bottom mold 142, and a blow core mold (blow nozzle mold) 143. A plurality of (for example, two) cavities 141a for molding the preform 10 into the hollow container 20 are formed in the blow cavity mold 141. The stretch blow molding part 140 includes a stretching rod 145 that is inserted into the preform 10 and stretches the preform 10 in an axial direction.

The plurality of blow cavity molds 141 provided in the stretch blow molding part 140 are arranged adjacent to one another, and the plurality of blow cavity molds 141 are configured to be integrally moved and clamped. As shown in FIG. 1, in the present embodiment, two blow cavity molds (one of the split molds) 141 are fixed to one blow mold fixing plate 146, and a mold clamping device (mold clamping mechanism) 147 is coupled to the blow mold fixing plate 146. That is, when the mold clamping device 147 moves the blow mold fixing plate 146, the two blow cavity molds 141 are clamped or opened at the same time.

In such a stretch blow molding part 140, the hollow container 20 that is a final molded product is formed by stretch blow molding each preform 10 disposed in the cavity 141a of the blow cavity mold 141.

Specifically, as shown in FIG. 3, the stretching rod 145 is moved (lowered) and a bottom portion of the preform 10 is pressed by the stretching rod, and blow air (primary air) is introduced into the preform 10, thereby stretching the preform 10 in a vertical axis direction and a horizontal axis direction. That is, the preform 10 is expanded to a predetermined size.

More specifically, as shown in (a) of FIG. 3, first, the stretching rod 145 is moved (lowered) to a preset first position P1, and the preform 10 is stretched in the vertical axis direction by the stretching rod 145. Next, when the stretching rod 145 reaches a preset first position P1, low-pressure blow air (primary air) is introduced into the preform 10, and the preform 10 is stretched in the vertical axis direction and the horizontal axis direction ((b) of FIG. 3). That is, the first position P1 is a reference position based on which the primary air starts to be introduced into the preform 10. During the introduction of the primary air, the stretching rod 145 continues to be moved (lowered). The primary air is set to have a pressure of, for example, 0.3 MPa to 1.5 MPa.

Thereafter, as shown in (c) of FIG. 3, when the stretching rod 145 is moved (lowered) to a preset second position P2 (lower than the first position P1), the pressure of the blow air introduced into the preform 10 is changed. That is, the blow air to be introduced into the preform 10 is switched from the primary air to the secondary air having a higher pressure than the primary air. That is, the second position P2 is a reference position based on which the secondary air starts to be introduced into the preform 10. The preform 10 is further stretched in the vertical axis direction and the horizontal axis direction by the switching from the primary air to the secondary air. At the same time, the stretching rod 145 is moved downward from the second position P2 to further stretch the preform 10 in the vertical axis direction, and the stretching rod 145 is stopped at a third position P3 that is a preset final lowered position (stretching completion position). As a result, the hollow container 20 that is a final molded product is formed ((d) of FIG. 3). The secondary air is set to have a pressure of, for example, 2.0 MPa to 3.5 MPa.

After the blow air inside the hollow container 20 is exhausted, the hollow container 20 molded by the stretch blow molding part 140 (stretch blow molding mold 144) is conveyed to a take-out position Pa outside the stretch blow molding part 140 by the gripping mechanism conveyance part 155 at a timing when a subsequent preform 10 is conveyed. Then, the hollow container 20 is taken out of the apparatus at the take-out position Pa (see FIG. 1).

In the stretch blow molding part 140, the N preforms 10 formed at a time by the injection molding part 110 are divided by n (n is an integer of 2 or more), and M (N/n, M being a natural number) hollow containers 20 are formed at a time. In the present embodiment, 12 preforms 10 formed at a time by the injection molding part 110 are divided by three, and four preforms 10 are stretch blow molded at a time to form the hollow container 20.

As described above, in the injection stretch blow molding apparatus 100, the stretch blow molding is performed three times by the stretch blow molding part 140 when one injection molding is performed by the injection molding part 110, so that a time when the one stretch blow molding can be performed is very short. Therefore, it is necessary to control a movement of the stretching rod 145 and a supply of the blow air in the stretch blow molding with high accuracy.

Therefore, in the injection stretch blow molding apparatus 100, an actual position of the stretching rod 145 is detected, and start and stop of introduction of the blow air (primary air and secondary air) into the preform 10 are controlled based on the detected actual position of the stretching rod 145. That is, regarding the control of introduction of the blow air into the preform 10, although a timer control type in which a blow start time is set as a starting point is used in the related art, a position control type based on the actual position of the stretching rod 145 is used in the present embodiment.

Figure 4:
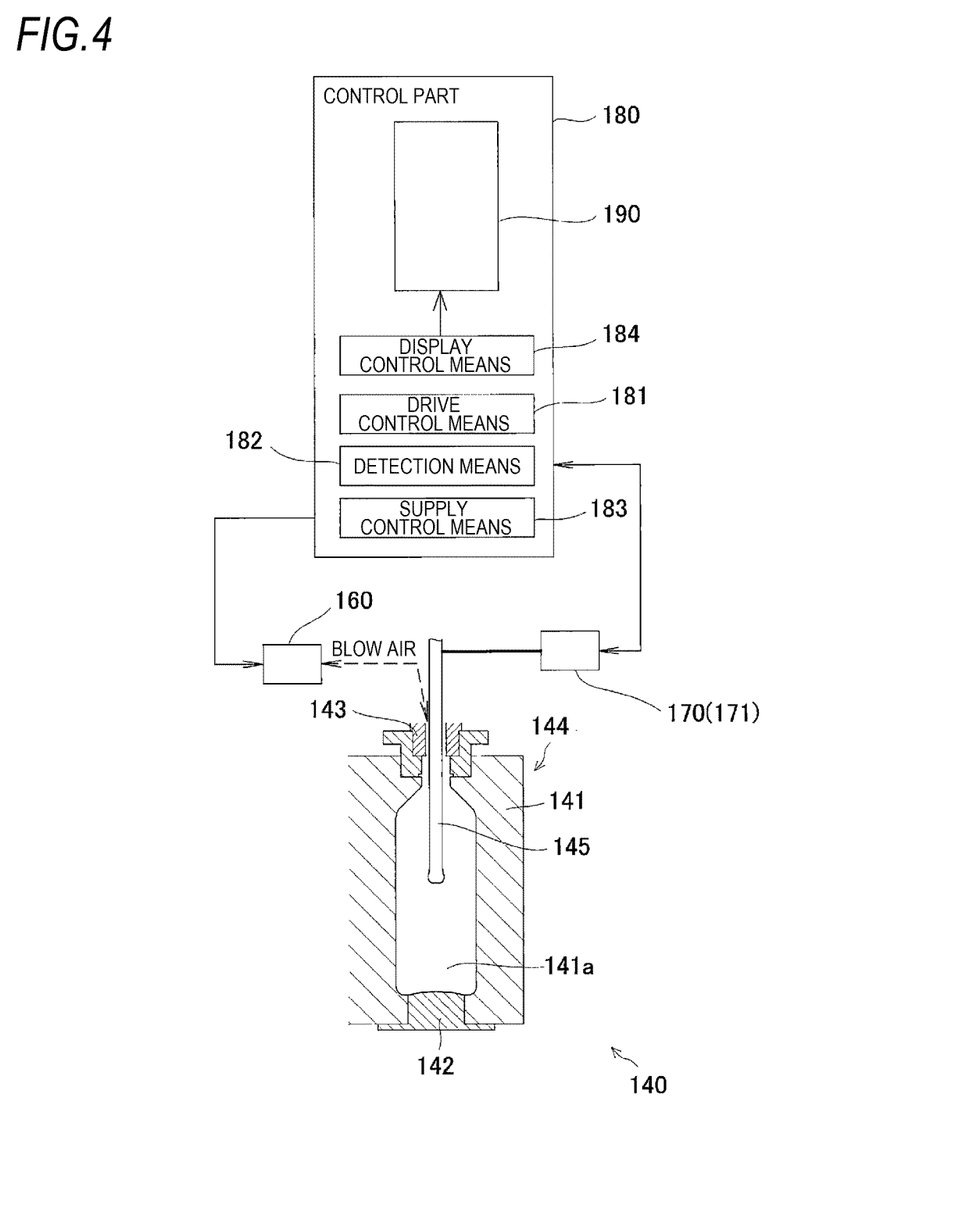
FIG. 4 is a block diagram showing a configuration of a stretch blow molding part according to an embodiment of the present disclosure.

Here, as shown in the block diagram in FIG. 4, the stretch blow molding part 140 includes a supply part 160 that supplies blow air to the blow core mold 143 (preform 10), a drive part 170 that drives the stretching rod 145, and a control part 180 that controls the supply part 160 and the drive part 170.

Although not shown in the drawings, the supply part 160 includes an air source and an air tank, and further includes a supply system that supplies blow air from the air tank to the blow core mold 143 and an exhaust system that exhausts the blow air from the blow core mold 143. The drive part 170 includes an electric drive source that moves (lifts or lowers) the stretching rod 145. In the present embodiment, the drive part 170 includes a servo motor (electric motor) as the drive source.

The control part 180 controls operations of various devices provided in the injection stretch blow molding apparatus 100. For example, the control part 180 controls the supply part 160 and the drive part 170. The control part 180 includes, for example, an input and output device, a storage device (ROM, RAM, or the like), a central processing unit (CPU), a timer counter, and the like.

Specifically, the control part 180 includes drive control means 181, detection means 182, and supply control means 183. The drive control means 181 controls the movement (lifting and lowering) of the stretching rod 145 by the servo motor of the drive part 170. The drive control means 181 appropriately controls, for example, the start and stop of the movement of the stretching rod 145, a moving speed of the stretching rod 145, and the like based on setting conditions set by an operator.

The detection means 182 detects an actual position of the stretching rod 145 based on a rotational position (output value of an encoder) of a servo motor 171 provided in the drive part 170. A method of detecting the actual position of the stretching rod 145 by the detection means 182 is not particularly limited.

The supply control means 183 controls a supply state of the blow air based on the detection result of the detection means 182. Specifically, the supply control means 183 controls the supply part 160 based on the actual position of the stretching rod 145 detected by the detection means 182 to appropriately control the start and stop of the supply of the blow air to the blow core mold 143, that is, the start and stop of introduction of the blow air (primary air and secondary air) into the preform 10. Therefore, the supply control means 183 can switch the blow air to be introduced into the preform 10 from the primary air to the secondary air based on the detection result of the detection means 182. In the present embodiment, when the detection means 182 detects that the actual position of the stretching rod 145 is at the second position P2, the supply control means 183 controls the supply part 160 so as to switch the blow air to be introduced into the preform 10 from the primary air to the secondary air.

In this manner, when the stretching rod 145 reaches the two set lowered positions (the first position P1 and the second position P2), the blow air (primary air and secondary air) is appropriately introduced into the preform 10 in the present embodiment. As a result, it is possible to introduce the blow air according to a length and an extension state of the preform 10, and it is possible to deal with a high cycle of container molding. That is, it is possible to manufacture the hollow container 20 that is difficult to be molded under a high cycle condition in the related art. For example, it is possible to manufacture a large number of thin-walled containers having a weight of 10 g or less at the same time under a condition in which a blow molding time is 0.6 seconds.

The control part 180 includes a relatively large display (display means) 190 that displays, on a screen, setting information for setting control conditions of various devices to be controlled, and display control means 184 that controls a display state of the screen of the display 190.

Figure 5:
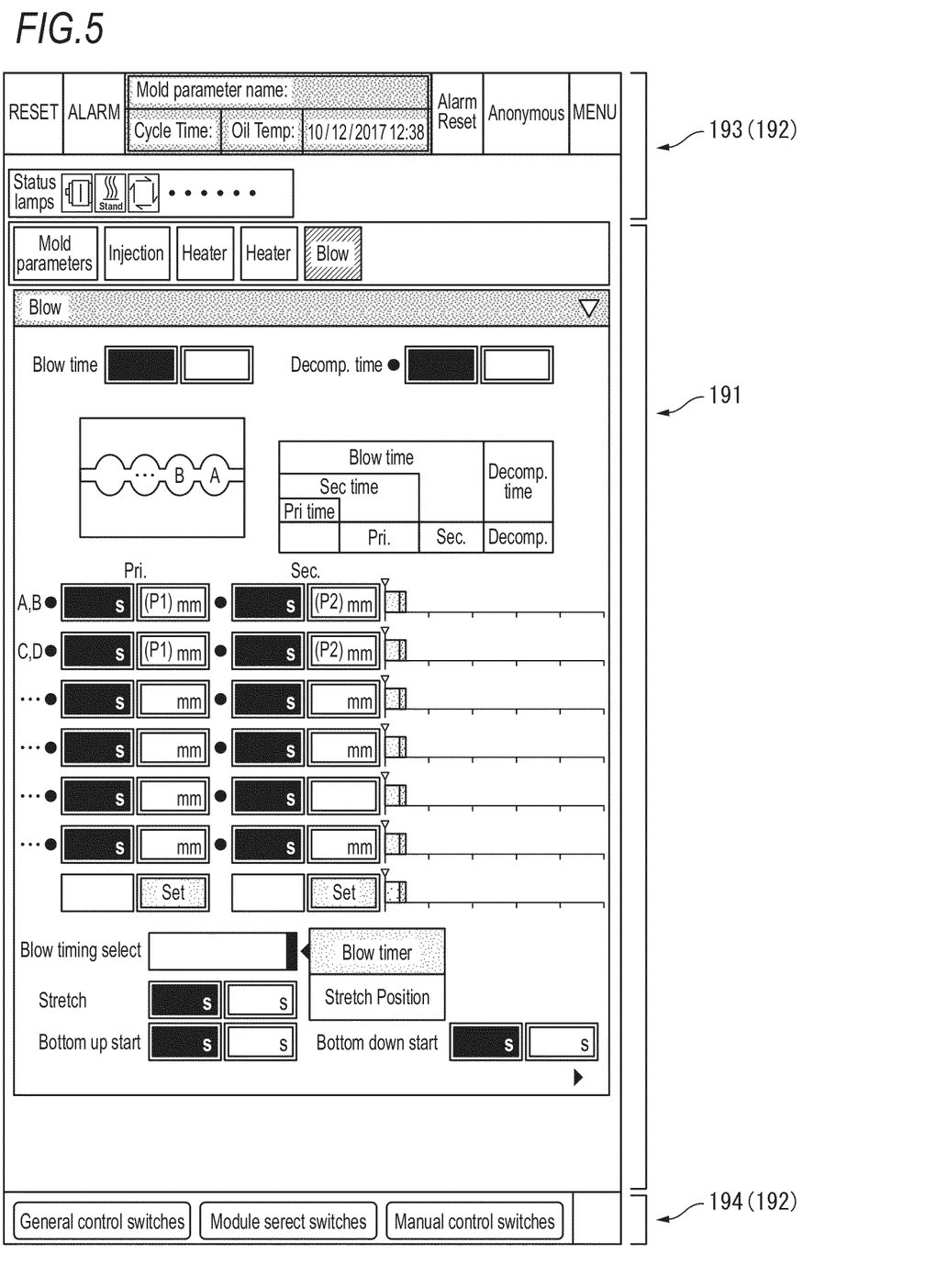
FIG. 5 is a diagram showing a display example of a display provided in a control part according to a first embodiment.

As shown in FIG. 5, the display 190 is provided with a main display part 191 capable of setting and displaying various types of information (control conditions, setting values, and the like) as necessary, and a sub-display part 192 that constantly displays specific information and the like. In the present embodiment, a central region of the display 190 functions as the main display part 191, and a header portion 193 at an upper side of the main display part 191 and a footer portion 194 at a lower side of the main display part 191 function as the sub-display part 192.

The display 190 is implemented by, for example, a touch panel, and functions as input means through which an operator inputs various control conditions (operation conditions of various devices and control conditions of various stations).

The display control means 184 causes the main display part 191 of the display 190 to display information for setting control conditions as necessary. For example, in the stretch blow molding, the display control means 184 displays a screen on which the actual position of the stretching rod 145 and the supply state of the blow air including the primary air and the secondary air can be set in association with each other.

In a case where the operator controls the supply part 160 by a blow air supply control of a position control type, the operator inputs various control conditions (setting values) to the display 190 that functions as a touch panel. For example, in the main display part 191, a blow molding time ("Blow time"), a blow air exhaust time ("Decomp. time"), and the like are input, and a value (P1) of the first position, a value (P2) of the second position, and a value (P3) of the third position are input as actual positions of the stretching rod 145 respectively to a primary blow start position ("Pri."), a secondary blow start position ("Sec."), and a stretching completion position (not shown). By performing such input operations, the operator can set a timing when the supply part 160 supplies the primary air to be introduced into the preform 10 at the primary blow (Pri.) and set a timing when the supply part 160 supplies the secondary air to be introduced into the preform 10 at the secondary blow (Sec.). The timings of supplying the blow air can be set for each cavity 141a. The main display part 191 can display a time (actual measurement value) taken by the stretching rod 145 to reach each of the first position P1, the second position P2, and the third position P3.

As described above, in the injection stretch blow molding apparatus 100 according to the present embodiment, the operator can appropriately set conditions of the blow air supply control of a position control type on one screen.

Further, the injection stretch blow molding apparatus 100 can switch between a blow air supply control of a position control type and a blow air supply control of a timer control type. Accordingly, the operator can select a control system for the stretch blow molding according to the hollow container 20 to be molded, and the versatility of the apparatus is improved.

In the example shown in FIG. 5, blow air introduction controls can be switched by selecting any one of first blow air introduction control means (timer control: "Blow timer") that defines an introduction start timing of the blow air including the primary air and the secondary air based on a timer (elapsed time) and second blow air introduction control means (position control: "Stretch Position") that defines an introduction start timing of the blow air including the primary air and the secondary air based on an actual position (lowered position) of the stretching rod, in a blow air introduction timing selection field ("Blow timing select") on the screen of the display 190.

As described above, in the resin container (hollow container) manufacturing apparatus and the resin container (hollow container) manufacturing method according to the present disclosure, a preform can be appropriately stretched to stably manufacture a resin container (hollow container) having good quality even under a condition (high cycle condition) in which a stretch blow molding time is very short.

In the resin container (hollow container) manufacturing method according to the present disclosure, the supply control means 183 switches the blow air to be introduced into the preform 10 from the primary air to the secondary air based on the detected actual position of the stretching rod 145. Therefore, the movement of the stretching rod 145 and introduction start times of the primary air and the secondary air can be appropriately balanced. As a result, the preform can be appropriately stretched to manufacture a resin container (hollow container) having good quality.

In the resin container (hollow container) manufacturing method according to the present disclosure, the first position P1 and the second position P2 are set, in which the first position P1 is a reference position based on which introduction of the primary air is started and the second position P2 is a reference position based on which introduction of the secondary air having a higher pressure than the primary air is started. The supply control means 183 starts to introduce the primary air when the actual position of the stretching rod 145 reaches the first position P1, and starts to introduce the secondary air when the actual position of the stretching rod 145 reaches the second position P2 located below the first position P1. Specifically, when the detection means 182 detects that the actual position of the stretching rod 145 is at the second position P2, the supply control means 183 switches the blow air to be introduced into the preform 10 from the primary air to the secondary air. Therefore, in the resin container (hollow container) manufacturing method according to the present disclosure, the blow air can be switched with high accuracy based on the actual position of the stretching rod 145. That is, it is possible to perform horizontal axis stretching (stretching in the horizontal axis direction) of the preform 10 by the primary air and the secondary air in a manner of corresponding to vertical axis stretching (stretching in the vertical axis direction) of the preform 10 by the stretching rod 145, and the vertical axis stretching and the horizontal axis stretching can be performed in a more balanced manner. In the resin container (hollow container) manufacturing method according to the present disclosure, the introduction of the secondary air is started when it is detected that the actual position of the stretching rod 145 is at the second position P2 located below the first position P1. That is, since the introduction of the secondary air is performed at an appropriate timing by a position control based on the actual position of the stretching rod 145, it is possible to prevent misalignment and poor thickness distribution of a container. In order to improve quality such as rigidity of the container, it is necessary to increase oriented crystallinity of a resin material for forming the container. In order to increase the oriented crystallinity, it is effective to increase a stretching speed of the resin material (to move (lower) the stretching rod at a high speed, introduce the blow air in a short time, and stretch the preform in a short time). However, when the stretching speed of the resin material is increased, it is difficult to appropriately match the movement of the stretching rod and the introduction timing of the blow air in a timer control type. On the other hand, in the resin container (hollow container) manufacturing apparatus and resin container manufacturing method according to the present disclosure, even when the stretching speed of the resin material is increased, the movement of the stretching rod 145 and the introduction timing of the blow air can be easily and appropriately matched with each other, and even under a condition in which a molding cycle time is shortened, a container having higher quality than the container in the related art can be manufactured.

Second Embodiment

Next, a second embodiment of the present disclosure will be described in detail with reference to FIGS. 6 to 8. In the description of the second embodiment, the same parts as those in the first embodiment will be omitted. The second embodiment is different from the first embodiment in that switching from the primary air to the secondary air is performed when a predetermined standby time has elapsed from a time point when the stretching rod 145 is moved (lowered) to the second position P2.

Figure 6:
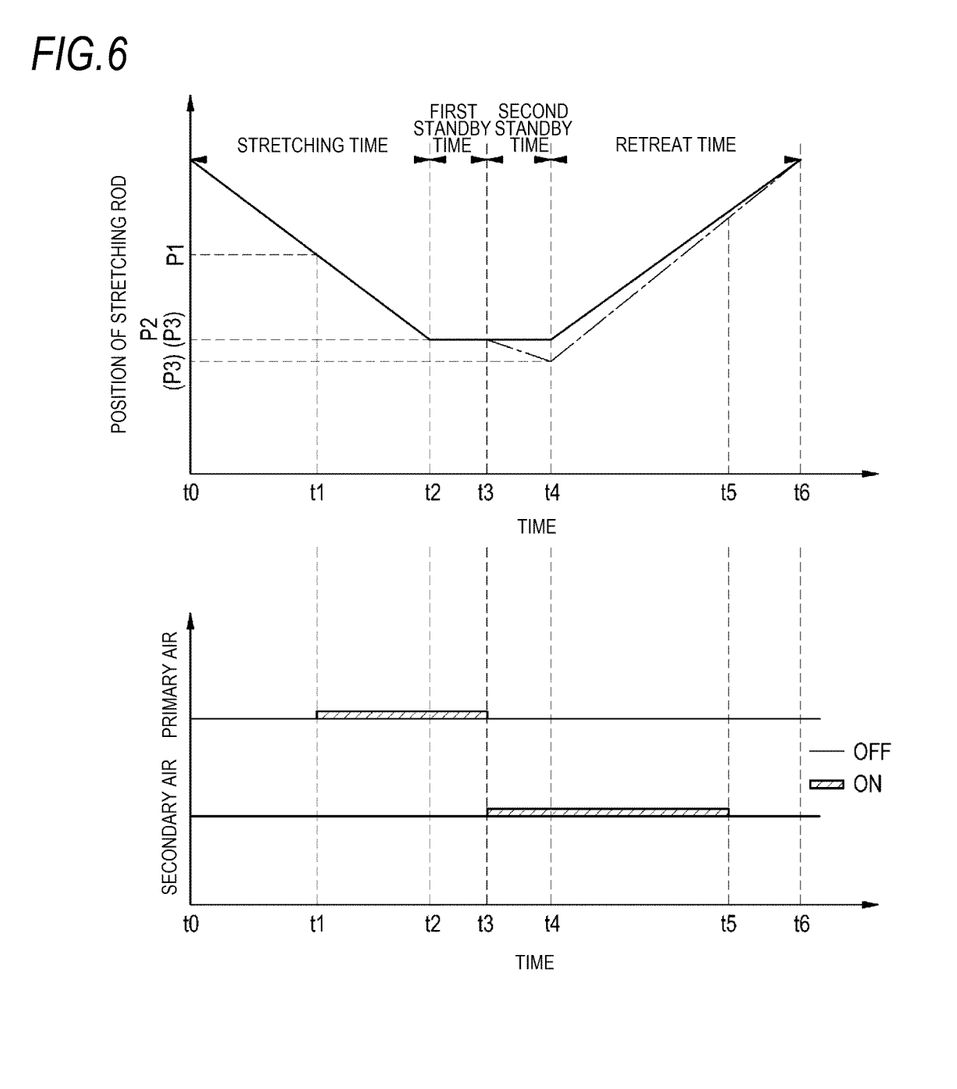
FIG. 6 is a diagram showing a position of a stretching rod at each time point.
Figures 7A, 7B, 7C, 7D, 7E:
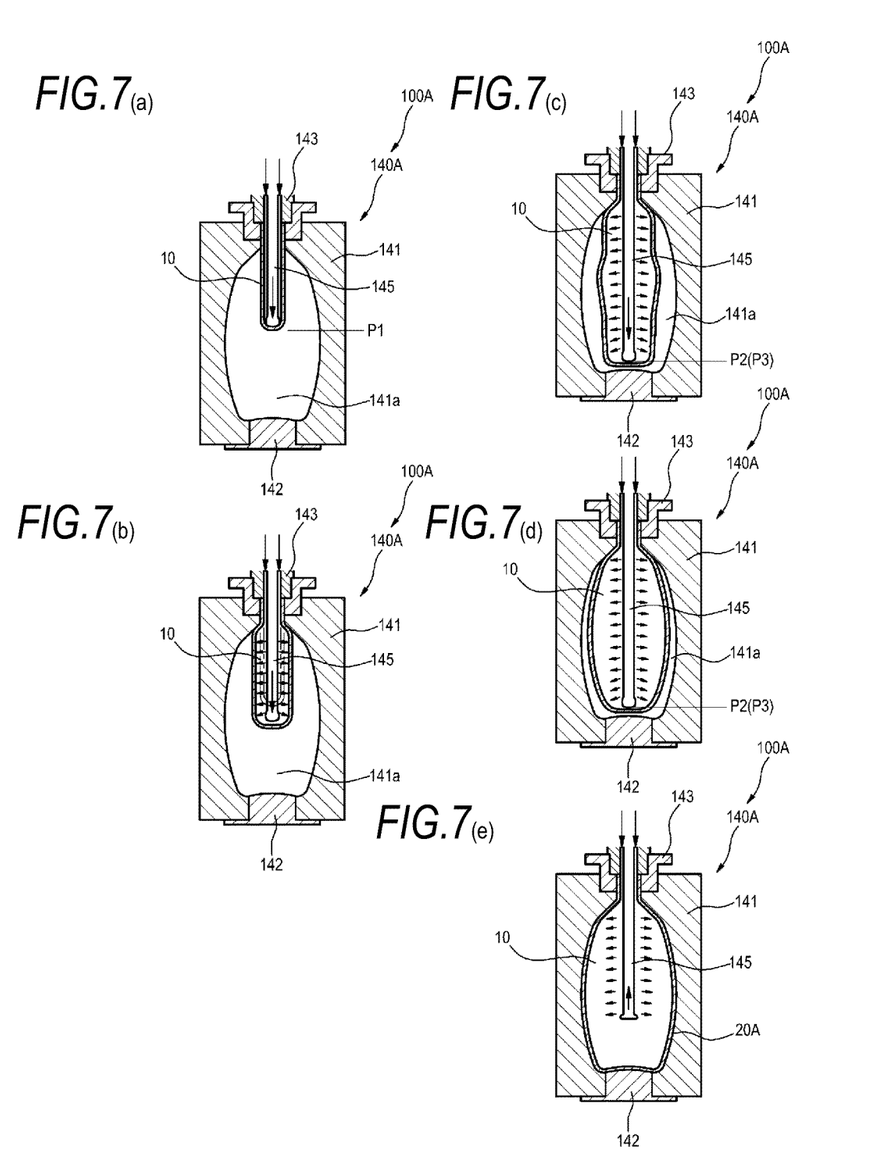
FIG. 7(a), FIG. 7(b), FIG. 7(c), FIG. 7(d), and FIG. 7(e) show a procedure for molding a hollow container by a stretch blow molding part according to an embodiment of the present disclosure.

FIG. 6 is a diagram showing a position of the stretching rod 145 at each time point. FIG. 7 is a diagram showing a procedure for molding a hollow container 20A by a stretch blow molding part 140A according to the second embodiment. In the present specification, a time period during which the stretching rod 145 is lowered from an initial position to the second position P2 (a time period from a time point t0 to a time point t2) is referred to as a stretching time, a time period during which the stretching rod 145 is stopped at the second position P2 and the primary air is introduced into the preform 10 (a time period from the time point t2 to a time point t3) is referred to as a first standby time, a time period during which the stretching rod 145 is stopped at the second position P2 and the secondary air is introduced into the preform 10 (a time period from the time point t3 to a time point t4) is referred to as a second standby time, and a time period during which the stretching rod 145 is lifted from the second position P2 to the initial position (a time period from the time point t4 to a time point t6) is referred to as a retreat time. In the example indicated by a solid line in FIG. 6 in the second embodiment, the second position P2 and the third position P3 are set to be the same position.

As shown in FIG. 6, from the time point t0 to the time point t1, the stretching rod 145 is lowered to the first position P1. As a result, the preform 10 is stretched in the vertical axis direction. Meanwhile, from the time point t0 to the time point t1, since the blow air is not introduced into the preform 10, the preform 10 is not stretched in the horizontal axis direction ((a) of FIG. 7).

From the time point t1 to the time point t2, the stretching rod 145 is lowered to the second position P2 from the first position P1 and is not stopped at the first position P1. That is, the stretching rod 145 continues to be lowered during the stretching time, and the preform 10 continues to be stretched in the vertical axis direction. Meanwhile, at the time point t1, the detection means 182 detects that the stretching rod 145 is lowered to the first position P1, and transmits the detection result to the supply control means 183. The supply control means 183 controls the supply part 160 to introduce the primary air into the preform 10 based on the detection result. As a result, at the time point t1, the primary air starts to be introduced into the preform 10. When the primary air is introduced into the preform 10, the preform 10 is stretched in the horizontal axis direction ((b) of FIG. 7).

Next, the actual position of the stretching rod 145 and the blow air to be introduced into the preform 10 in the first standby time will be described. At the time point t2, the detection means 182 detects that the stretching rod 145 is lowered to the second position P2, and transmits the detection result to the drive control means 181. Based on the detection result, the drive control means 181 controls the stretching rod 145 such that the stretching rod 145 is stopped at the second position P2 during a time period from a time point when it is detected that the actual position of the stretching rod 145 is at the second position P2 to when the first standby time and the second standby time has elapsed (that is, a time period from the time point t2 to the time point t4). Therefore, in the first standby time and the second standby time, the stretching rod 145 is stopped at the second position P2. At the time point t2, the detection means 182 transmits the detection result to the supply control means 183. The supply control means 183 that received the detection result controls the supply part 160 so as to switch the blow air to be introduced into the preform 10 from the primary air to the secondary air when the predetermined first standby time set in advance by the operator has elapsed from the time point when it is detected that the actual position of the stretching rod 145 is at the second position P2 (that is, at the time point t3). That is, the second position P2 in the present embodiment is a position serving as a starting point (reference) when the supply control means 183 starts to count the time point when the secondary air starts to be introduced into the preform 10. Since the supply control means 183 controls the supply part 160 in such a manner, the primary air continues to be introduced into the preform 10 in the first standby time. Therefore, at the time point t2, a substantially central portion in the vertical axis direction of a side surface of the preform 10 is brought into a state in which the substantially central portion is bulged in the horizontal axis direction to an extent greater than that of the other portions ((c) of FIG. 7), and at the time point t3, the preform 10 is brought into a state in which a sufficient amount of primary air is introduced into the preform 10 ((d) of FIG. 7). Then, at the time point t3, introduction of the secondary air having a pressure higher than the pressure of the primary air is started.

Next, the actual position of the stretching rod 145 and the blow air to be introduced into the preform 10 during a time period from the time point t3 to the time point t6 (the second standby time and the retreat time) will be described. As described above, the stretching rod 145 is stopped at the second position P2 in the second standby time. That is, the second position P2 and the third position P3 are the same position as indicated by the solid line in FIG. 6. At the time point t4, the drive control means 181 controls the stretching rod 145 so as to lift the stretching rod 145 from the second position P2 to the initial position. That is, at the time point t4, the stretching rod 145 starts to be moved upward relative to a bottom portion of the preform 10. At the time point t6, the detection means 182 detects that the stretching rod 145 is lifted to the initial position, and transmits the detection result to the drive control means 181. The drive control means 181 controls the stretching rod 145 based on the detection result, so that the stretching rod 145 is stopped at the initial position. Therefore, in the retreat time, the stretching rod 145 continues to be lifted, and at the time point t6, the lifting of the stretching rod 145 is stopped. On the other hand, from the time point t3 to the time point t5, the secondary air continues to be introduced into the preform 10. As a result, at the time point 5, the preform 10 becomes the hollow container 20A that is a final molded product ((e) of FIG. 7). At the time point t5, the supply control means 183 controls the supply part 160 to stop the supply of the blow air and exhaust the blow air. Therefore, from the time point t5 to the time point t6, the blow air is not supplied to the preform 10 and is exhausted.

Figure 8:
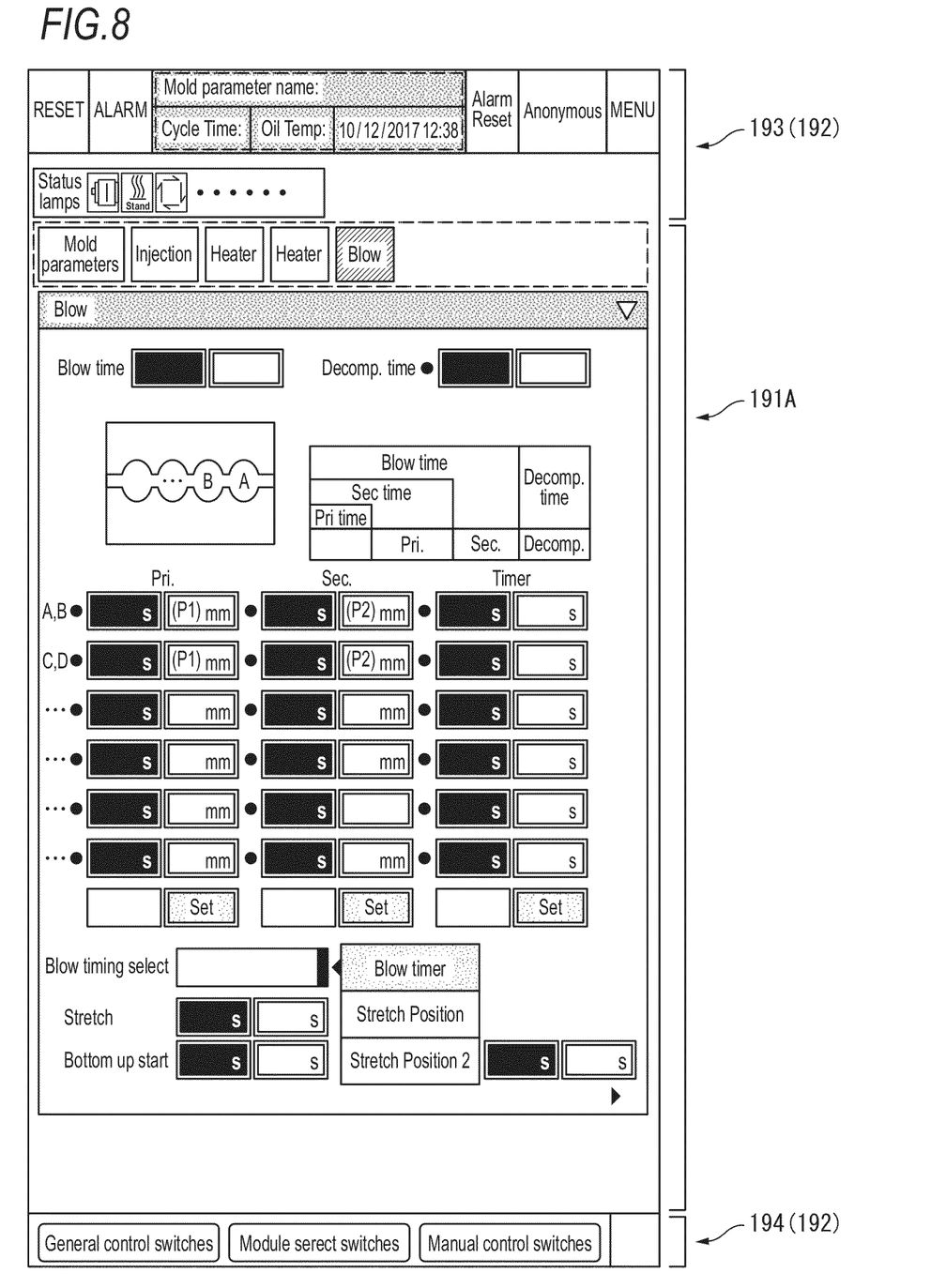
FIG. 8 is a diagram showing a display example of a display provided in a control part according to a second embodiment.

FIG. 8 is a diagram showing a display example of a display 190A according to the second embodiment. As shown in FIG. 8, the display 190A according to the second embodiment is provided with a main display part 191A capable of setting and displaying various types of information (control conditions, setting values, and the like) as necessary, and the sub-display part 192 that has the same configuration as that in the first embodiment. The main display part 191A is different from the main display part 191 according to the first embodiment in that a setting and display region related to a timer control (Timer) by the supply control means 183 is provided adjacent (adjacent to a right side in FIG. 8) to a display region related to the secondary blow (Sec.), and third blow air introduction means (position and timer combined control "Stretch Position 2") is added in which the third blow air introduction means defines an introduction start timing of the blow air including the primary air and the secondary air based on both a lowered position of the stretching rod and a timer (elapse of time). A time corresponding to the first standby time is input (set) in the setting region related to the timer control (Timer). An actual measurement value of the first standby time is displayed in the display region related to the timer control (Timer). For example, when the operator performs a predetermined input operation corresponding to a resin container to be manufactured to the timer control (Timer), the supply control means 183 controls the supply part 160 so as to switch the blow air to be introduced into the preform 10 from the primary air to the secondary air when a time input by the operator has elapsed from a time point when the stretching rod 145 is lowered to the second position P2.

For example, in a case where a relatively large resin container (for example, a container of 1500 ml) is manufactured, it is necessary to introduce more primary air into the preform 10 before the introduction of the secondary air is started, as compared with a case where a small resin container (for example, a container of 500 ml) is manufactured. This is because a large resin container needs to have a width in the horizontal axis direction larger than that of a small resin container. Therefore, when the secondary air is introduced into the preform 10 while the primary air is not sufficiently introduced into the preform 10, a container having poor quality may be manufactured.

In the resin container (hollow container) manufacturing apparatus and the resin container (hollow container) manufacturing method according to the present disclosure, the supply control means 183 controls the supply part 160 so as to switch the blow air to be introduced into the preform 10 from the primary air to the secondary air when the predetermined first standby time (a time period from the time point t2 to the time point t3) has elapsed from a time point when the detection means 182 detects that the actual position of the stretching rod 145 is at the second position P2. Therefore, the primary air continues to be introduced into the preform 10 until the predetermined first standby time has elapsed from the time point when the detection means 182 detects that the actual position of the stretching rod 145 is at the second position P2, and thereafter, the secondary air starts to be introduced into the preform 10. Therefore, the primary air can be sufficiently introduced into the preform 10 before the secondary air is introduced into the preform 10. In this manner, the injection stretch blow molding apparatus 100A according to the second embodiment can introduce more primary air into the preform 10 before the secondary air is introduced, as compared with the injection stretch blow molding apparatus 100 according to the first embodiment. Therefore, the injection stretch blow molding apparatus 100A can manufacture a container having good quality particularly when a relatively large resin container is to be manufactured. In the resin container (hollow container) manufacturing apparatus and the resin container (hollow container) manufacturing method according to the present disclosure, even when the molding cycle time is short (a lowering speed of the stretching rod 145 is high), vertical stretching of the preform 10 by the stretching rod 145 and horizontal stretching of the preform 10 by the primary air and the secondary air can be performed in a balanced manner by a control combining a position control based on the actual position of the stretching rod 145 and a timer control. Therefore, the injection stretch blow molding apparatus 100A can appropriately stretch the preform 10, and as a result, a resin container (hollow container) having good quality can be manufactured.

In the resin container (hollow container) manufacturing apparatus and the resin container (hollow container) manufacturing method according to the present disclosure, the secondary air is introduced into the preform 10 during a time period (from the time point t3 to the time point t5) including the second standby time (a time period from the time point t3 to the time point t4). Therefore, the stretching rod 145 starts to be moved (lifted) toward the initial position after the secondary air is introduced into the preform 10 to a certain extent. Therefore, according to the injection stretch blow molding apparatus 100A, it is possible to prevent a shape of the container from becoming an unintended shape.

The present disclosure is not limited to the embodiments described above. For example, although a configuration including four cavities in which the stretch blow molding parts (stretch blow molding molds) are provided in a row has been described in the embodiments described above, the number of cavities is not particularly limited, and may be eight, twelve, or the like.

Although the drive control means 181 controls the stretching rod 145 such that the stretching rod 145 is stopped at the second position P2 in the first standby time and the second standby time in the second embodiment, the present invention is not limited to such an example. For example, as indicated by a dotted line in FIG. 6, the drive control means 181 may control the stretching rod 145 such that the stretching rod 145 is stopped at the second position P2 in the first standby time, and may control the stretching rod 145 such that the stretching rod 145 is further lowered to the third position P3 from the second position P2 in the second standby time. In this case, at the time point t4, the detection means 182, for example, detects that the stretching rod 145 is lowered to a bottom portion of the hollow container 20A, and transmits the detection result to the drive control means 181. Then, the drive control means 181 controls the stretching rod 145 based on the detection result so as to lift the stretching rod 145 to the initial position.

The present application is based on a Japanese patent application filed on Apr. 3, 2019 (Japanese Patent Application NO. 2019-071569), the contents of which are incorporated herein by reference.

The invention claimed is:

1. A resin container manufacturing apparatus configured to stretch a preform disposed in a stretch blow molding mold by a stretching rod and stretch the preform by introducing blow air into the preform so as to form a resin container, the resin container manufacturing apparatus comprising:
   a controller configured to switch a blow air introduction operation by selecting any one of a plurality of introduction operations; and
   a display configured to display, and receive an input of, setting information for setting control conditions of various devices,
   wherein the plurality of introduction operations comprise, at least:
      a first operation in which the blow air is introduced based on a timer; and
      a second operation in which the blow air is introduced based on an actual position of the stretching rod,
   wherein the controller comprises:
      a detector configured to detect the actual position of the stretching rod inserted into the preform; and
      a supply controller configured to control a supply state of the blow air based on a detection result of the detector, and
   wherein the controller is configured to select the blow air introduction operation based on the setting information input through the display.

2. The resin container manufacturing apparatus according to claim 1,
   wherein in the second operation, the supply controller is configured to:
      introduce primary air as the blow air into the preform based on a detection result by the detector indicating that the stretching rod reaches a first position; and
      switch the blow air introduced into the preform from the primary air to secondary air having a higher pressure than that of the primary air, based on a detection result by the detector indicating that the stretching rod reaches a second position.

3. The resin container manufacturing apparatus according to claim 1,
   wherein the plurality of introduction operations further comprise a third operation based on a combination of the timer and the actual position of the stretching rod.

4. The resin container manufacturing apparatus according to claim 3,
   wherein in the third operation, the supply controller is configured to:
      introduce primary air as the blow air into the preform based on a detection result by the detector indicating that the stretching rod reaches a first position; and
      switch the blow air introduced into the preform from the primary air to secondary air having a higher pressure than that of the primary air, in response to a first standby time having elapsed from a time point at which the detector detects that the stretching rod reaches a second position.

5. The resin container manufacturing apparatus according to claim 1,
 wherein a drive source of the stretching rod is a servo motor, and
 wherein the detector detects the actual position of the stretching rod based on a rotational position of the servo motor.

6. A resin container manufacturing method in which a preform disposed in a stretch blow molding mold is stretched by a stretching rod and the preform is stretched by introducing blow air into the preform so as to form a resin container, the resin container manufacturing method comprising:
 switching a blow air introduction operation by utilizing a controller for selecting any one of a plurality of introduction operations; and
 displaying, and receiving input of, setting information for setting control conditions of various devices via a display,
 wherein the plurality of introduction operations comprises, at least:
  a first operation in which the blow air is introduced based on a timer; and
  a second operation in which the blow air is introduced based on an actual position of the stretching rod,
 wherein the controller comprises:
  a detector configured to detect the actual position of the stretching rod inserted into the preform; and
  a supply controller configured to control a supply state of the blow air based on a detection result of the detector, and
 wherein the controller is configured to select the blow air introduction operation based on the setting information input through the display.

7. The resin container manufacturing method according to claim 6,
 wherein the second operation comprises:
  introducing primary air as the blow air into the preform in response to the stretching rod reaches a first position; and
  switching the blow air introduced into the preform from the primary air to secondary air having a higher pressure than that of the primary air, in response to the stretching rod reaches a second position.

8. The resin container manufacturing method according to claim 6,
 wherein the plurality of introduction operations further comprise a third operation based on a combination of the timer and the actual position of the stretching rod.

9. The resin container manufacturing method according to claim 8,
 wherein the third operation comprises:
  introducing primary air as the blow air into the preform in response to the stretching rod reaching a first position; and
  switching the blow air introduced into the preform from the primary air to secondary air having a higher pressure than that of the primary air, in response to a first standby time having elapsed from a time point at which the stretching rod reaches a second position.

10. The resin container manufacturing method according to claim 6, further comprising:
 detecting the actual position of the stretching rod based on a rotational position of a servo motor serving as a drive source of the stretching rod.

\* \* \* \* \*